United States Patent
Niemiec et al.

(10) Patent No.: US 11,197,143 B2
(45) Date of Patent: Dec. 7, 2021

(54) VIRTUAL PARTNER BYPASS

(71) Applicants: MOTOROLA SOLUTIONS, INC., Chicago, IL (US); Pawel Niemiec, Rzeszow (PL); Marcin Barnak, Warsaw (PL)

(72) Inventors: Pawel Niemiec, Rzeszow (PL); Marcin Barnak, Warsaw (PL)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 16/975,168

(22) PCT Filed: Apr. 16, 2018

(86) PCT No.: PCT/PL2018/050015
§ 371 (c)(1),
(2) Date: Aug. 24, 2020

(87) PCT Pub. No.: WO2019/203669
PCT Pub. Date: Oct. 24, 2019

(65) Prior Publication Data
US 2021/0092577 A1  Mar. 25, 2021

(51) Int. Cl.
*H04W 4/80* (2018.01)
*H04W 4/38* (2018.01)
*H04W 4/90* (2018.01)
*H04W 4/08* (2009.01)

(52) U.S. Cl.
CPC .............. *H04W 4/80* (2018.02); *H04W 4/38* (2018.02); *H04W 4/90* (2018.02); *H04W 4/08* (2013.01)

(58) Field of Classification Search
CPC ........... H04W 4/38; H04W 4/80; H04W 4/90; H04W 76/50; H04M 1/72418; H04M 1/21; H04M 1/24; H04M 3/5116
See application file for complete search history.

(56) References Cited

U.S. PATENT DOCUMENTS 9,420,099 B1*  8/2016  Krishnan ............. H04M 3/5116
10,276,031 B1*  4/2019  Ho ......................... G10L 25/63
(Continued)

FOREIGN PATENT DOCUMENTS

| WO | 2016209689 A1 | 12/2016 |
| WO | 2018026259 A1 | 2/2018 |
| WO | 2018038593 A1 | 3/2018 |

OTHER PUBLICATIONS

The International Search Report and the Written Opinion corresponding patent serial No. PCT/PL2018/050015 filed: Apr. 16, 2018, dated Sep. 28, 2018, all pages.

*Primary Examiner* — Wen W Huang (57) ABSTRACT

A method and apparatus for bypassing a virtual partner is provided herein. During operation a device will have knowledge of a status of sensors connected to form a personal-area network (PAN) and/or have knowledge of a current incident type assigned to a user. The device will then bypass digital-assistant functionality based on the status of associated PAN devices and/or the incident type. Thus, virtual-partner functionality will be bypassed based on a fact that a public-safety event has occurred. As discussed, the public-safety event may comprise a current incident assigned to a user, or a status of at least one device/sensor connected to form a PAN.

9 Claims, 6 Drawing Sheets

(56) References Cited

U.S. PATENT DOCUMENTS

| | | | |
|---|---|---|---|
| 2007/0047720 A1* | 3/2007 | Brandt | H04M 3/523 379/265.01 |
| 2009/0023425 A1* | 1/2009 | Hosain | H04M 3/5116 455/412.1 |
| 2011/0071880 A1* | 3/2011 | Spector | H04W 4/90 340/573.1 |
| 2012/0077536 A1 | 3/2012 | Goel et al. | |
| 2014/0057590 A1* | 2/2014 | Romero | H04W 4/02 455/404.2 |
| 2014/0194082 A1* | 7/2014 | Wingert | H04W 76/50 455/404.1 |
| 2015/0256990 A1* | 9/2015 | Vilrokx | H04W 76/50 455/404.1 |
| 2016/0057595 A1* | 2/2016 | Ahmed | H04W 4/02 455/404.1 |
| 2016/0335532 A1 | 11/2016 | Sanghavi et al. | |
| 2018/0288224 A1* | 10/2018 | Dizengof | H04W 4/38 |
| 2019/0050238 A1* | 2/2019 | Lim | H04W 4/38 |
| 2019/0251959 A1* | 8/2019 | Engles | H04M 3/58 |

\* cited by examiner

VIRTUAL PARTNER BYPASS

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (e.g., without further user input) and/or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, instructing users how to proceed with an assigned task, warning users of nearby dangers such as traffic accidents or environmental hazards, and providing many other types of information in a reactive or proactive manner.

Consider a digital assistant employed in a public-safety environment, commonly referred to as a "virtual partner" or "digital assistant" (in this document, the term "virtual partner" and "digital assistant" can be used interchangeably). Communication between an officer and a dispatch center will be passed through a virtual partner so that simple tasks requested by the officer or dispatch center will be performed by the virtual partner. Such tasks include such things as, but not limited to, a request for a status update, filtering unneeded messages during busy times, performing license-plate searches, . . . , etc.

While utilizing a virtual partner in a public-safety environment may increase productivity, on the other hand it may introduce delay. Small delay is acceptable in regular discussion, however may be unacceptable in critical situations. In critical situations officers need to be able to talk with each other with no delay. Because, of this, a method and apparatus are needed for bypassing a virtual partner during critical situations.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for bypassing a virtual partner is provided herein. During operation a device will have knowledge of a status of sensors connected to form a personal-area network (PAN) and/or have knowledge of a current incident type assigned to a user. The device will then bypass digital-assistant functionality based on the status of associated PAN devices and/or the incident type. Thus, virtual-partner functionality will be bypassed based on a fact that a public-safety event has occurred. As discussed, the public-safety event may comprise a current incident assigned to a user, or a status of at least one device/sensor connected to form a PAN.

Figure 1:
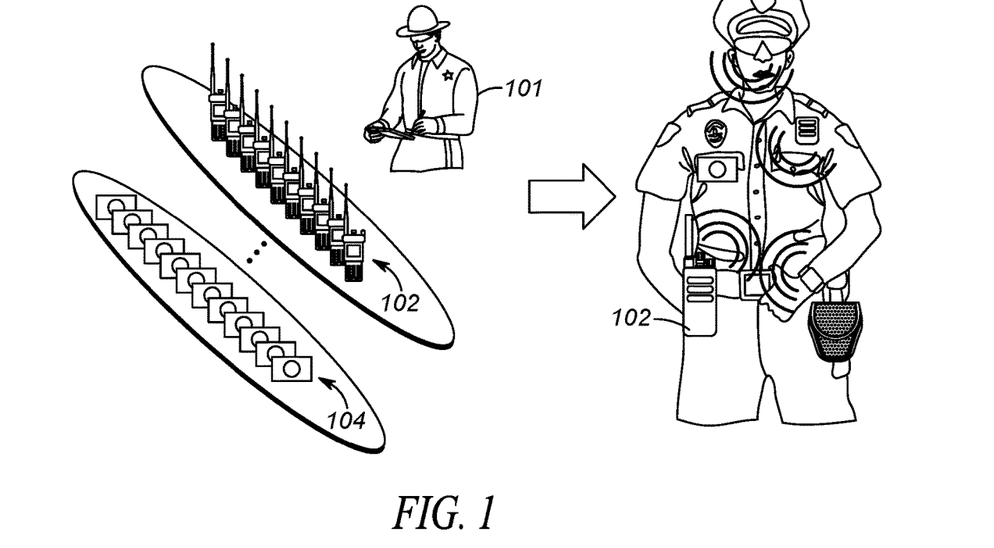
FIG. 1 illustrates an operational environment for the present invention.

Turning now to the drawings, wherein like numerals designate like components, FIG. 1 illustrates an operational environment for the present invention. As shown, a public safety officer 101 will be equipped with devices that determine various physical and environmental conditions surrounding the public-safety officer. These conditions are generally reported back to a dispatch center so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer will have an array of shelved devices available to the officer at the beginning of a shift. The officer may select some of the devices off the shelf, and form a personal area network (PAN) with the devices that will accompany the officer on his shift. For example, the officer may acquire a gun-draw sensor, a body-worn camera, a wireless microphone, a smart watch, a police radio, smart handcuffs, a man-down sensor, a bio-sensor, . . . , etc. All devices acquired by the officer will be configured to form a PAN by associating (pairing) with each other and communicating wirelessly among the devices. At least one device may be configured with a virtual partner. In a preferred embodiment, the PAN comprises more than two devices, so that many devices are connected via the PAN simultaneously.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown in FIG. 1, public-safety officer 101 has an array of devices to use during the officer's shift. For example, the officer may acquire one radio 102 and one camera 104 for use during their shift. Other devices may be acquired as well. As shown in FIG. 1, officer 101 will preferably wear the devices during a shift by attaching the devices to clothing. These devices will form a PAN throughout the officer's shift.

Figure 2:
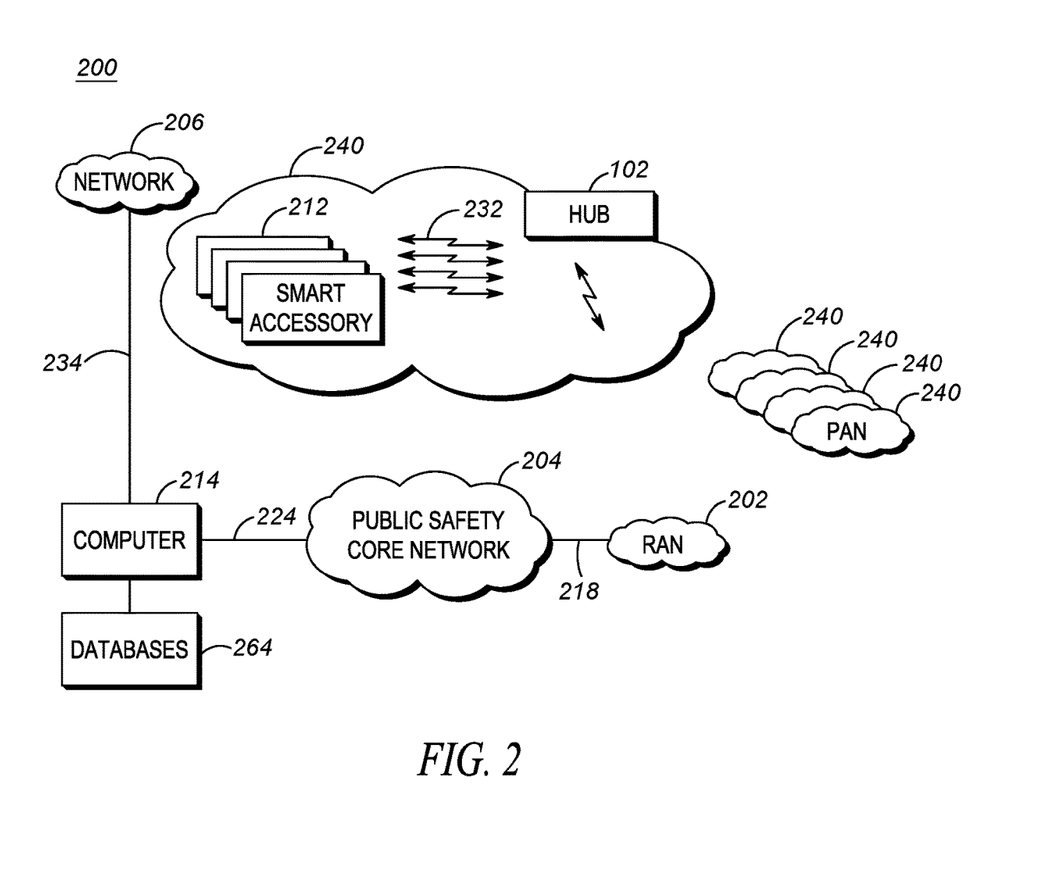
FIG. 2 depicts an example communication system that incorporates a personal-area network and a virtual partner.

FIG. 2 depicts an example communication system 200 that incorporates PANs created as described above. System 200 includes one or more radio access networks (RANs) 202, a public-safety core network 204, high-speed data network 206, hub (PAN master device) 102, local devices (slave devices that serve as smart accessories/sensors) 212, computer 214, and communication links 218, 224, 232, and 234. In a preferred embodiment of the present invention, hub 102 and devices 212 form PAN 240, with communication links 232 between devices 212 and hub 102 taking place utilizing a short-range wireless communication system protocol such as a Bluetooth communication system protocol. Each officer will have an associated PAN 240. Thus, FIG. 2 illustrates multiple PANs 240 associated with multiple officers.

RAN 202 includes typical RAN elements such as base stations, base station controllers (BSCs), routers, switches, and the like, arranged, connected, and programmed to provide wireless service to user equipment (e.g., hub 102, and the like) in a manner known to those of skill in the relevant art. RAN 202 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards.

High-speed data network 206 is provided. Network 206 may comprise a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, network 206 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Sensor 212 data (which may include video) shared among officers (and reported to dispatch center 214) is typically (but not necessarily) accomplished by utilizing network 206, capable of achieving large data rates, while voice communications take place through network 204. Thus, voice communications among public-safety officers typically take place through one network, while data shared among public-safety officers typically take place through another network.

Public-safety core network 204 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 204 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between wireless and/or wireline participants in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Hub 102 serves as a PAN master device, and may be any suitable computing and communication device configured to engage in wireless communication with RAN 202 and/or network 206 over the air interface as is known to those in the relevant art. Moreover, one or more hubs 102 are further configured to engage in wired and/or wireless communication with one or more local device 212 via the communication link 232. Hub 102 will be configured to determine when to forward information received from PAN devices 212 to, for example, dispatch center 214. The information can be forwarded to the dispatch center via RANs 202 and/or network 206 based on a combination of device 212 inputs. In one embodiment, all information received from sensors 212 will be forwarded to center 214 via RAN 202 or network 206. In another embodiment, hub 102 will filter the information sent, and only send high-priority information back to dispatch center 214.

It should also be noted that any one or more of the communication links 218, 224, 232, 234 could include one or more wireless-communication links and/or one or more wired-communication links.

In a preferred embodiment, devices 212 and hub 102 comprise any device capable of forming a PAN, although the present invention may be implemented for devices not forming a PAN. Devices 212 may comprise, for example, a gun-draw sensor, a body temperature sensor, an accelerometer, a heart-rate sensor, a breathing-rate sensor, a camera, a man-down sensor, a GPS receiver capable of determining a location, speed, and direction of the user device, smart handcuffs, a clock, calendar, sound detector, environmental sensors (e.g. a thermometer capable of determining an ambient temperature, humidity, presence of dispersed chemicals, radiation detector, electric field detector, magnetic field detector, etc.), an accelerometer, a biometric sensor (e.g., wristband), a barometer, speech recognition circuitry, a gunshot detector, an ambient sound detector . . . , etc. Some examples follow:

A sensor-enabled holster 212 may be provided that maintains and/or provides state information regarding a weapon or other item normally disposed within the user's sensor-enabled holster 212. The sensor-enabled holster 212 may detect a change in state (presence to absence) and/or an action (removal) relative to the weapon normally disposed within the sensor-enabled holster 212. The detected change in state and/or action may be reported to a portable radio acting as hub 102 via its short-range transceiver. In some embodiments, the sensor-enabled holster may also detect whether the first responder's hand is resting on the weapon even if it has not yet been removed from the holster and provide such information to portable radio 102. Other possibilities exist as well. Such sensor-enabled holsters typically comprise a switch that is "pressed" when a gun is inserted into a holster. Removal of the gun causes the switch to activate.

A biometric sensor 212 (e.g., a biometric wristband) may be provided for tracking an activity of the user or a health status of the user 101, and may include one or more movement sensors (such as an accelerometer, magnetometer, and/or gyroscope) that may periodically or intermittently provide to the portable radio (acting as hub 102) indications of orientation, direction, steps, acceleration, and/or speed, and indications of health such as one or more of a captured heart rate, a captured breathing rate, and a captured body temperature of the user 101, perhaps accompanying other information.

An accelerometer 212 may be provided to measures acceleration and provide this information to hub 102. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

A heart rate sensor 212 may be provided and use electrical contacts with the skin to monitor an electrocardiography (EKG) signal of its wearer, or may use infrared light and imaging device to optically detect a pulse rate of its wearer, among other possibilities, and report this information to hub 102.

A breathing rate sensor 212 may be provided to monitor breathing rate and provide this information to hub 102. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor 212 may be provided, and report temperature to hub 102. Such a sensor includes an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities. Temperature sensor 212 may be used on equipment to determine if the equipment is being worn or not. For example, temperature sensor 212 may exist interior to a bullet-proof vest. I the temperature sensor 212 senses a temperature above a predetermined threshold (e.g., 80 degrees), it may be assumed that the vest is being worn by an officer.

Computer 214 comprises, or is part of, a computer-aided-dispatch center (sometimes referred to as an emergency-call center), that may be manned by an operator providing necessary dispatch operations. For example, computer 214 typically comprises a graphical user interface that provides the dispatch operator necessary information about public-safety officers. As discussed above, much of this information originates from devices/sensors 212 providing information to hub 102, which forwards the information to RAN 202/network 206 and ultimately to computer 214.

Computer 214 may comprise a virtual partner (e.g., a microprocessor serving as a virtual partner/digital assistant) that is configured to receive sensor data from sensors 212, keep track of relevant information and understand the situational context of user. The virtual partner will reactively provide officer-requested information, or may provide information automatically based one or more sensor status or triggers in which the virtual partner may proactively provide such valuable information to the user absent any explicit request from the user (e.g., "I see you have stopped on the side of the road, do you need assistance").

Expanding on the above, each user of the system may possess a hub with many associated devices forming a PAN. For each user of the system, computer 214 may track the user's current associated PAN devices (sensors 212) along with sensor data for that user. This information may be used to compile a summary for each user (e.g., equipment on hand for each user, along with state information for the equipment). The information is preferably stored in database 264. This information may be used by any virtual partner to provide valuable content to the user. As discussed, the content may be provided spontaneously, or in response to a query.

With the above in mind, computer 214 is also configured with a natural language processing (NLP) engine configured to determine the intent and/or content of the any over-the-air voice transmissions received (not shown in FIG. 2). The NLP engine may also analyze oral queries and/or statements received from any user and provide responses to the oral queries and/or take other actions in response to the oral statements. It should be noted that any over-the-air communication between users (e.g., on the talkgroup) will be monitored by the NLP engine (unless bypassed) in order to determine the content of the over-the-air voice transmission.

A computer-aided dispatch (CAD) incident identifier can be utilized by computer 214 to determine a current bypass state of a virtual partner for each user. An incident identification (sometimes referred to as an incident scene identifier, or a CAD incident identifier (CAD ID)) is generated for incidents where an officer is dispatched/assigned, or where an officer encounters a public-safety event. This ID (which is assigned to an officer) could be something as simple as a number associated with a particular incident type, or something as complicated as an identification that is a function of populated fields (e.g., time, location, incident type, . . . , etc.), one of which may comprise an incident type.

Figure 3:
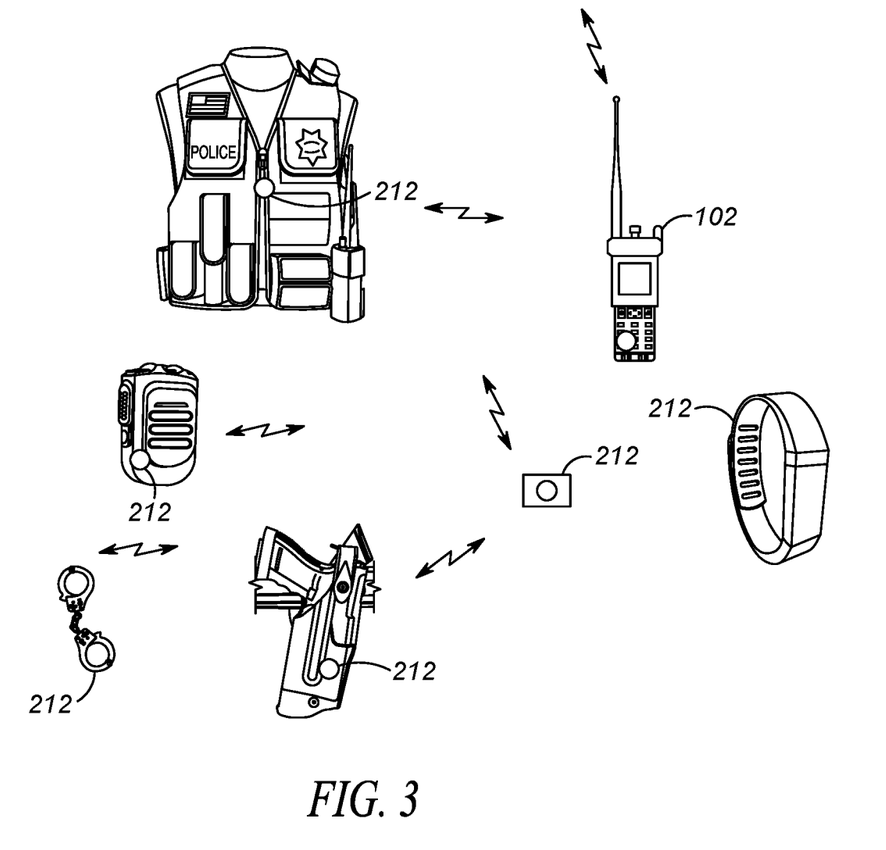
FIG. 3 is a more-detailed view of a personal-area network of FIG. 2.

FIG. 3 depicts another view of a personal-area network 240 of FIG. 2. Personal-area network comprises a very local-area network that has a range of, for example 10 feet. As shown in FIG. 3, various devices 212 are that attach to clothing utilized by a public-safety officer. In this particular example, a bio-sensor is located within a police vest, a voice detector is located within a police microphone, smart handcuffs 212 are usually located within a handcuff pouch (not shown), a gun-draw sensor is located within a holster, a smart watch 212 is provided to monitor various biological parameters (e.g., heartrate, blood pressure, . . . , etc.) and a camera 212 is provided.

Devices 212 and hub 102 form a PAN 240. PAN 240 preferably comprises a Bluetooth PAN. Devices 212 and hub 102 are considered Bluetooth devices in that they operate using a Bluetooth, a short range wireless communications technology at the 2.4 GHz band, commercially available from the "Bluetooth special interest group". Devices 212 and hub 102 are connected via Bluetooth technology in an ad hoc fashion forming a PAN. Hub 102 serves as a master device while devices 212 serve as slave devices.

Hub 102 provides information to the officer, and/or forwards local status alert messages describing each sensor state/trigger event over a wide-area network (e.g., RAN/Core Network) to computer 214. In alternate embodiments of the present invention, hub 102 may forward the local status alerts/updates for each sensor to mobile and non-mobile peers (shift supervisor, peers in the field, etc), or to the public via social media. RAN core network preferably comprises a network that utilizes a public-safety over-the-air protocol. Thus, hub 102 receives sensor data via a first network (e.g., Bluetooth PAN network), and forwards the information to computer 214 via a second network (e.g., a public safety wide area network (WAN) or a high-speed data network (WAN)). When the virtual partner is located within computer 214, any request to the virtual partner will be made via the second network. In addition, any communication from the virtual partner to computer 214 will take place using the second network.

As described above a virtual-partner bypass is needed for critical situations in order to speed up communications. In order to address this issue, all virtual partners (whether located within dispatch center 214 or hub 102) will be bypassed based on public-safety events. These events may include the status of sensors 212, processed sensor data, and/or an incident type (CAD ID) currently assigned to an officer. For example, if dispatch center 214, or hub 102 detects that Officer Smith has drawn his gun, Officer Smith's queries will bypass any virtual partner. In a similar manner, queries made by other officers (not having drawn their guns) may be sent to a virtual partner.

As described above, the virtual partner may also be bypassed for officers assigned to a particular incident. So, for example, an officer assigned a first CAD ID will have a virtual partner bypassed, and an officer assigned a second CAD ID by computer 214, will not have a virtual partner bypassed. The bypass state assigned to a particular incident can be set either manually by the dispatch operator, or may be pre-programmed.

Expanding on the above, assume a dispatch operator receives an emergency call (e.g., 911 call) reporting a burglary in progress. The operator instructs computer 214 to assign this incident to Officer Fred. Officer Fred is assigned a CAD ID corresponding to a burglary in progress. Because of this, Officer Fred's queries to the dispatch center may bypass any virtual partner (i.e., all queries made after assignment to a particular incident will have the virtual partner bypassed).

In another example, Officer Ethan and his teammates are assigned to patrol in one area with CAD ID #ABC123, while Officer Darren and his teammates are assigned to patrol in another different area with CAD ID #DEF456. During patrolling, Officer Ethan found something threatening at an abandoned house and drew his gun. Officers assigned to CAD ID #ABC123 will be auto assigned a "bypass state", and any query made by Officer Ethan and his teammates (regardless if his teammates also draw their guns or not) will have their virtual partners bypassed.

In another example, Officer Serena is patrolling with her partner. While querying regarding a motorcycle that is parked illegally, she saw someone run into a bank carrying something that looks like a gun. Due to the urgency, she queried loud and fast to retrieve any CCTV image on that person to confirm if that person is armed: She states loudly, "Can someone check and see of the person with yellow cap entering OCBC bank is armed!!!" as compared to her previous slow and steady tone when querying regarding the illegally parked motorcycle. Officer Serena's audio data during her query is collected through microphone sensor and processed to determine that the loudness (audio data amplitude) and utterance speed (time duration on the parsed wording separation) is exceeding certain threshold and thus the virtual partner will be bypassed and the query provided directly to a dispatch operator.

In another example, Officer Ethan is patrolling with his tablet and RSM (remote speaker microphone) worn on his body. When he sees a suspicious person and queries about the person. At a later time, Officer Ethan spies another suspicious person running. Officer Ethan pursues the person and his motion sensor detects running, generates a CAD ID associated with a pursuit, and assigns a bypass state to any further query based on the incident type (CAD ID). While running, Officer Ethan again communicates with the dispatch center, which is provided directly to the dispatch operator, bypassing any virtual partner circuitry.

Figure 4:
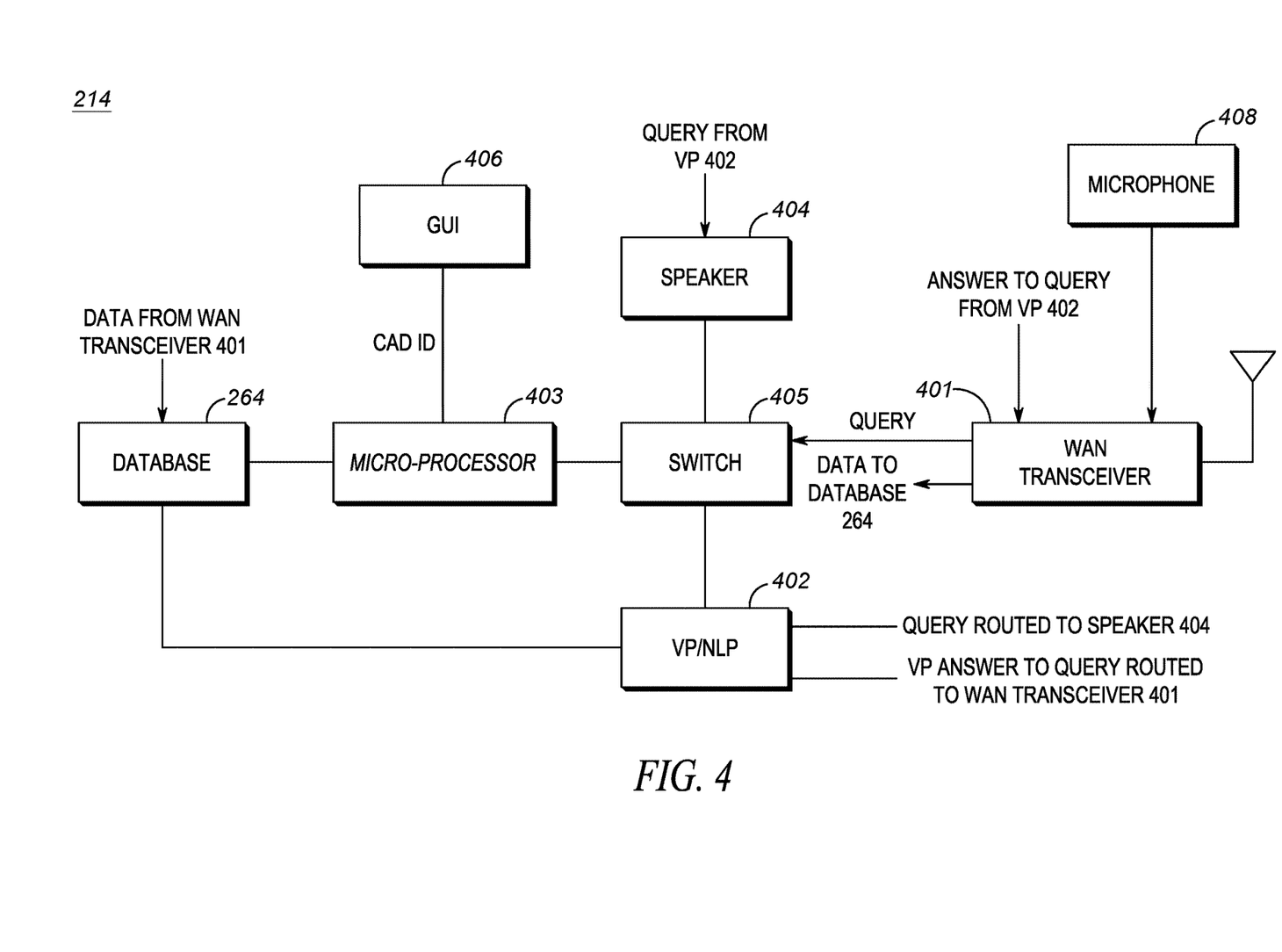
FIG. 4 is a block diagram of a dispatch center.

With the above examples in mind, FIG. 4 sets forth a schematic diagram that illustrates dispatch center 214 comprising a virtual partner to determine a public-safety event (e.g., a status of devices/equipment and/or an incident assigned to an officer), and bypass virtual partner circuitry accordingly. In an embodiment, the device is embodied within computer 214 (dispatch center 214), however in alternate embodiments the device may be embodied within the public-safety core network 204, or more computing devices in a cloud compute cluster (not shown), or some other communication device not illustrated in FIG. 2, and/or may be a distributed communication device across two or more entities. In this particular embodiment, dispatch center 214 may receive multiple queries from multiple officers, and bypass virtual-partner functionality for each of them as described above, or alternatively, may receive multiple communications from the same officer, and bypass virtual-partner functionality for each communication as described above.

FIG. 4 shows those components (not all necessary) for dispatch center 214 to determine what equipment is present, determine a status of the equipment present, determine an incident assigned to an officer, and to bypass virtual-partner functionality accordingly.

As shown, dispatch center 214 may include a wide-area-network (WAN) transceiver 401 (e.g., a transceiver that utilizes a public-safety communication-system protocol and/or a high-speed data protocol), Virtual Partner 402 (which includes a natural-language processor), circuitry acting as a switch 405, speaker 404, graphical-user interface (GUI) 406, database 264, microphone 408, and logic circuitry 403. In other implementations, dispatch center 214 may include more, fewer, or different components. Regardless, all components are connected via common data busses as known in the art.

WAN transceiver 401 may comprise well known long-range transceivers that utilize any number of network system protocols. (As one of ordinary skill in the art will recognize, a transceiver comprises both a transmitter and a receiver for transmitting and receiving data). For example, WAN transceiver 401 may be configured to utilize a next-generation cellular communications protocol operated by a cellular service provider, and/or any public-safety protocol such as an APCO 25 network or the FirstNet broadband network. WAN transceiver 401 receives communications from users, as well as sensor data from users. It should be noted that WAN transceiver 401 is shown as part of dispatch center 214, however, WAN transceiver 401 may be located in RAN 202 (e.g., a base station of RAN 202), with a direct link to dispatch center 214. WAN transceiver 401 can both transmit to, and receive information from public-safety officer's hub 102. Particularly, transceiver 401 is configured to receive voice communications (such as a user query) from a user operating hub 401. WAN transceiver is also configured to receive sensor data from hub 102, which is stored in database 264.

Virtual partner 402 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place. Virtual partner 402 provides the user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic virtual partner may reactively provide such requested valuable information, or may be based on some other set of one or more context or triggers (i.e., the joining of a talkgroup, a sensor status, . . . , etc.) in which the electronic virtual partner may proactively provide such valuable information to the user absent any explicit request from the user.

During operation, virtual partner 402 receives a user voice communication (e.g., a query) from switch 405. If a "voice" response to the query is generated by virtual partner 402, then the response is sent to WAN transceiver 401 where it is transmitted to hub 102. However, if virtual partner 402 cannot provide a response to the query, the query is then forwarded to speaker 404, where a dispatch operator hears the query, and can adequately respond.

Logic circuitry 403 comprises a digital signal processor (DSP), general purpose microprocessor, a programmable logic device, or application specific integrated circuit (ASIC) and is configured to operate switch 405 to bypass virtual partner 402 as discussed above. This is accomplished by controlling switch 405 to direct a received query to speaker 404, bypassing virtual partner 402.

Database 264 comprises standard memory (such as RAM, ROM, . . . , etc) and serves to store user identifications along with associated hubs 102 and their PAN devices 212. The state of each PAN device may be stored as well. As discussed above, the data stored in database 264 can originate from hub 102 (received at WAN transceiver 401). Database 264 is also used to store a table mapping bypass states based on CAD ID. Such a table is shown below in Table 1.

TABLE 1

CAD ID mapping to VP bypass state.

| CAD ID | Incident Type | Bypass State |
|--------|---------------|--------------|
| 0001 | Armed Robbery | Bypass VP |
| 0002 | Vehicle Citation | No Bypass VP |
| 0003 | Foot Pursuit | Bypass VP |
| . . . | . . . | . . . |

Database 264 may also comprise a table of sensor states and their associated virtual-partner bypass state. This is shown below in Table 2.

TABLE 2

Virtual-Partner Bypass State based on Sensor State

| Sensor and its state | Virtual partner bypass state |
|----------------------|------------------------------|
| Gun draw sensor indicates no gun drawn | No virtual-partner bypass |
| Gun draw sensor indicates gun has been drawn | Bypass virtual partner |
| Accelerometer indicates walking | No virtual-partner bypass |
| Accelerometer indicates running | Bypass virtual partner |
| . . . | . . . |

GUI 406 provides a man/machine interface for receiving an input from a user and displaying information. For example, GUI 506 may provide a way of conveying (e.g., displaying) information received from processor 403. Part of this information may comprise sensor status information received from various officer's, CAD ID information assigned to various officer, . . . , etc. GUI 506 may also be used to assign a particular officer a particular CAD ID. In order to provide the above features (and additional features), GUI 506 may comprise any combination of a touch screen, a computer screen, a keyboard, or any other interface needed to receive a user input and provide information to the user.

Finally, speaker 404 comprises a standard circuitry that converts electrical impulses into sound. During operations, speaker 404 will output any query routed to it from virtual partner 402 or from switch 405.

With the above in mind, and as an example, WAN transceiver may be continuously receiving sensor data via over-the-air communications and passing this sensor data to database 264, thus compiling a history of user's associated PAN sensors and their status. (It should be noted that sensor data may pass through logic circuitry 403 prior to being stored in database 264). Logic circuitry 403 may also be receiving incident information assigned to officers via GUI 406, and storing this information within database 264. (It should be noted that all sensor data, CAD IDs, and voice communications received, will have an associated officer identification so that the information may be associated with a particular officer).

Based on the CAD ID and sensor data for a particular officer, logic circuitry 403 will instruct switch 405 to bypass virtual partner 402 (for a particular officer ID) or not. If the virtual partner is bypassed for a particular officer, voice communications from that officer will be routed by switch 405 directly to speaker 404 for an audible output that can be heard by any user of GUI 406. If the virtual partner is not bypassed, voice communications will be routed by switch 405 to virtual partner 402 where natural-language processing will take place in order to determine if virtual partner 402 should respond to the voice communications. If virtual partner 402 responds to the voice communications, the virtual partner communication is routed to WAN transceiver 401 where it is transmitted to the officer. However, if virtual partner 402 does not have a response to the voice communications, it will route the voice communication to speaker 404 for an audible output that can be heard by any user of GUI 406.

Consider the following example, a voice communication is received at WAN 401 from Officer Fred stating, "how far is First Street from my location?". The voice communication is output to switch 405 where it is routed either to speaker 404 or virtual partner 402. If it is routed to virtual partner 402, an answer to the query may be determined by VP 402. If an answer is determined by virtual partner 402, the answer is output to WAN transceiver 401 and transmitted to Officer Fred. However, if an answer to the query is not obtainable by virtual partner 402, the voice communications is routed to speaker 404 so that a dispatch operator may hear the query.

Thus, hub 102 may send a voice communication to dispatch center 214. Such communications may be something as simple as "advice please", or may be more specific, such as, "Please give me advice on how to handle this heart-attack victim". Alternatively, no query may be sent, and virtual partner 402 may simply provide information unsolicited (e.g., based on received sensor data stored in database 264). A dispatch operator may send a response to hub 102 via WAN transceiver 401 for any voice communications routed to speaker 404. More particularly, a dispatch operator will speak into microphone 408, providing the answer to the query to WAN transceiver 401, which transmits the answer to hub 102.

It should be noted that the above description had the virtual partner functionality encompassed within dispatch center 214. In an alternate embodiment this functionality may be encompassed within hub 102. When encompassed within hub 102, hub 102 will determine whether or not to bypass its internal virtual partner based on whether or not a public-safety event has occurred. More particularly, a user of hub 102 may speak a query into a microphone (or a query may be heard by the microphone). The query can be sent to a virtual partner, or transmitted directly to the dispatch center, or a combination of both. For example, under normal operating conditions, the query is sent to the virtual partner within hub 102. The virtual partner attempts to provide an answer to the query. If an answer cannot be provided, the query may be forwarded to dispatch center 214. During certain public-safety incidents, the query may bypass the virtual partner and be sent directly to the dispatch center. Such a hub 102 is shown in FIG. 5.

Figure 5:
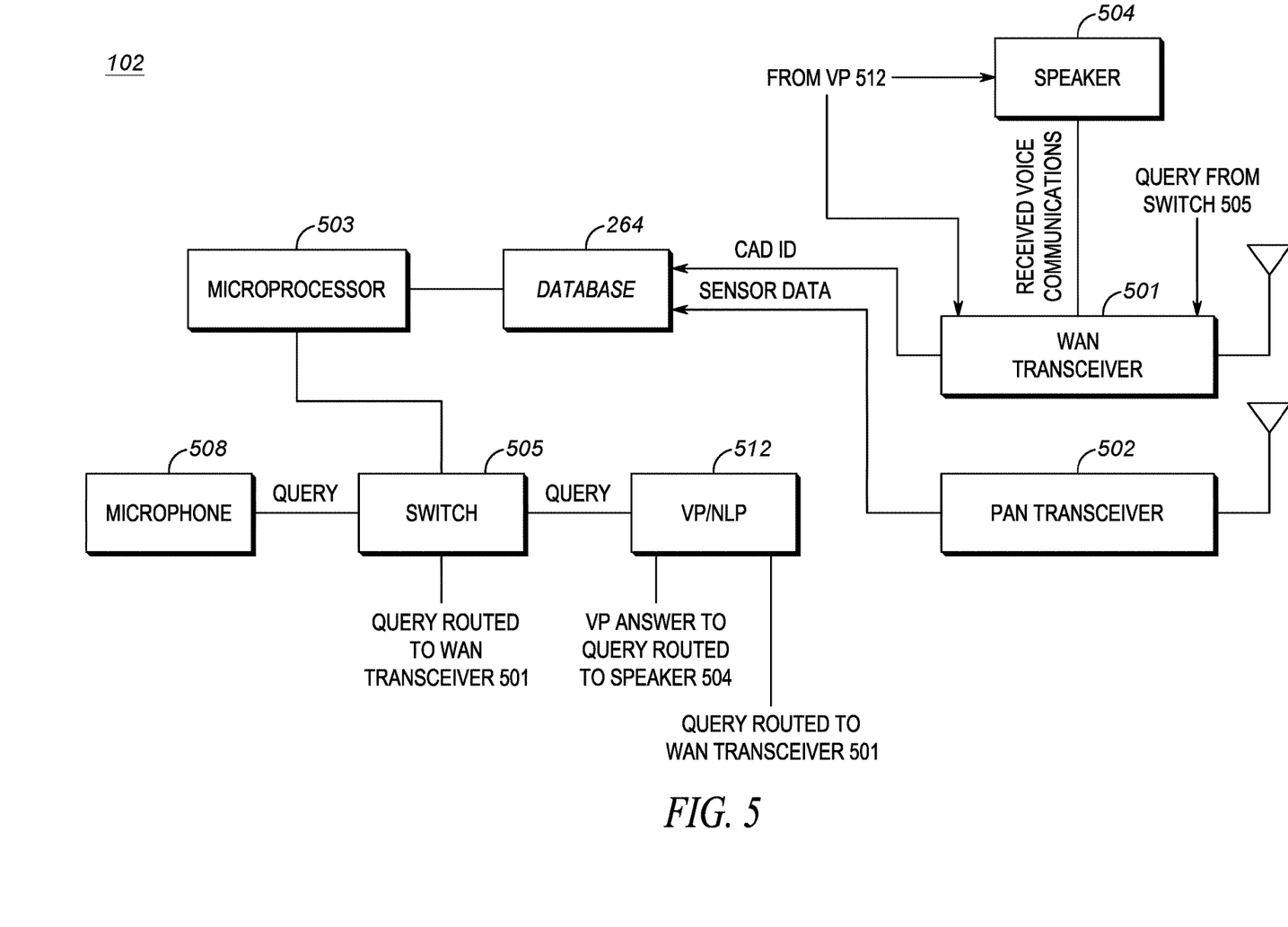
FIG. 5 is a block diagram of a hub.

As shown in FIG. 5, hub 102 includes a wide-area-network (WAN) transceiver 501 (e.g., a transceiver that utilizes a public-safety communication-system protocol), PAN transceiver 502 (e.g., a short-range transceiver), switch 505, database 264, logic circuitry 503, speaker 504, microphone 508, and virtual partner/NLP 512. In other implementations, hub 102 may include more, fewer, or different components. These components are similar to those discussed above with respect to FIG. 4.

PAN transceiver 502 may be well known short-range (e.g., 30 feet of range) transceivers that utilize any number of network system protocols. For example, PAN transceiver 502 may be configured to utilize Bluetooth communication system protocol for a body-area network, or a private 802.11 network. PAN transceiver forms the PAN (acting as a master device) with various sensors 212.

Database 264 comprises standard memory (such as RAM, ROM, . . . , etc) and serves to store PAN member names (identifications), their statuses, and any incident assigned to hub 102. So, for example, database 410 may comprise a list of PAN members (long gun, bullet-proof vest, gun-draw sensor, accelerometer, . . . , etc.) that formed a PAN with hub 102. Database 410 also store status information for each sensor (e.g., long gun in use, bullet-proof vest being worn, dun-draw sensor indicating a gun is holstered, . . . , etc.). This information is received from PAN transceiver as sensor data. Similarly, database may store CAD IDs received from the dispatch center (or generated by hub 102). Finally, information included in Table 1 and Table 2 is stored in database 264.

During operation, logic circuitry 503 will control switch 505 to bypass virtual partner 512 as discussed above. More specifically, when virtual partner 512 is bypassed, a query received from microphone 508 is sent directly to WAN transceiver 501 to be transmitted to the dispatch center. However, if virtual partner 512 is not bypassed, then the query is sent to virtual partner 512 which attempts to provide an answer to the query. If an answer is determined by virtual partner 512, the answer is sent to speaker 504. If an answer cannot be determined, then virtual partner 512 outputs the query to WAN transceiver where it is transmitted to dispatch center 214. Any voice communications received from dispatch center 214 are routed to speaker 504 for audible output.

In another embodiment of the present invention, all voice communications from dispatch center 214 (or other officers) is passed to a virtual partner prior to being sent to a speaker. Simple requests (e.g., "what's your status") may be answered by the virtual partner instead of bothering the officer. Such a configuration of hub 102 is shown in FIG. 6.

Figure 6:
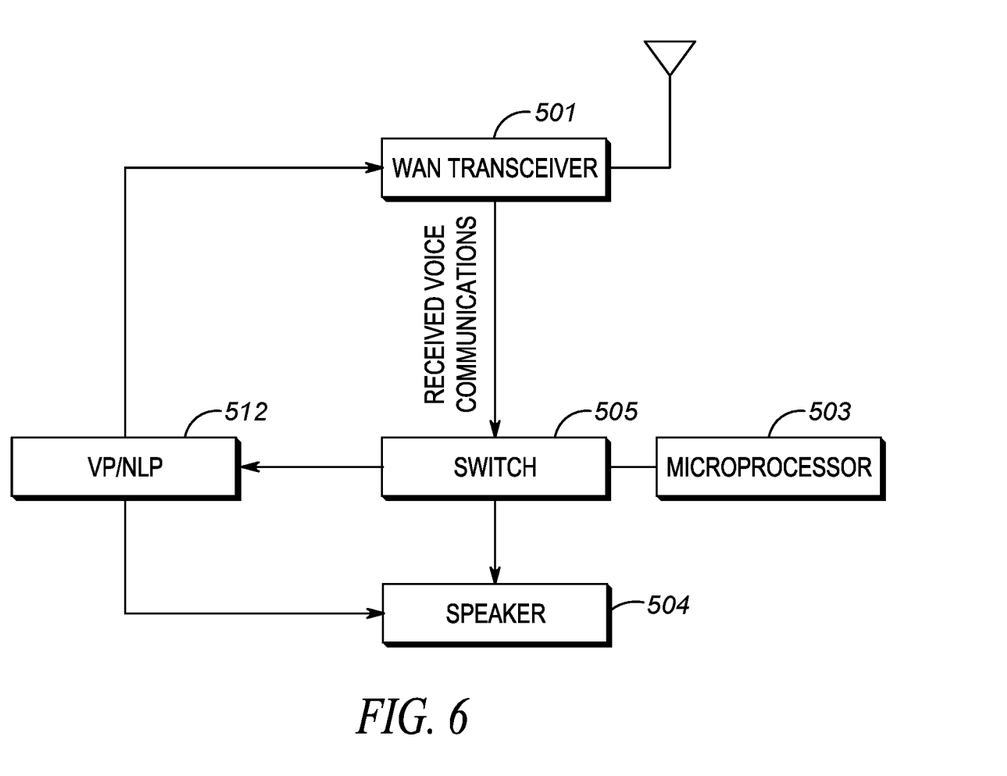
FIG. 6 is a block diagram of a hub.

In FIG. 6, many components are left out for ease of illustration. For example, no PAN transceiver, and database are shown in FIG. 6. During operation of the hub shown in FIG. 6, WAN transceiver 501 receives a query (or voice communication) from the dispatch center or from another officer. The query is passed to switch 505, which can direct it to virtual partner 512, or speaker 504. If directed to virtual partner 512, virtual partner 512 attempts to answer the query, and if an answer is determined, the answer is output to WAN transceiver 501, and sent to the originator of the query. However, if virtual partner 512 cannot answer the query, then the query is sent to speaker 504.

When virtual partner 512 is bypassed, the query is sent directly from switch 505 to speaker 504, and the user may answer the query without any aide from virtual partner 512.

Regardless of whether or not virtual-partner functionality exists within hub 102 or dispatch center 214, the logic circuitry will map a bypass state of the virtual partner to sensor status and/or incident type. The mapping process preferably comprises an operation that associates each element of a given set (the domain) with one or more elements of a second set (the range). The public-safety event (e.g., PAN sensor statuses and/or the CAD ID) for a user comprises the domain, while the bypass state comprise the range.

The mapping may be explicit based on predefined rules, or the mapping may be trained via neural network modeling. The bypass state (i.e., bypass the virtual partner or not) may comprise a numerical value, for example, 0 for bypass and 1 for no bypass. The mapping is done by determining PAN member status and/or CAD ID for a user, and mapping this information to a bypass state. For example, assume Officer Smith is assigned to a burglary, and has a weapon drawn. This combination (domain) may be mapped to a range of 0 (bypass the virtual partner). Similarly, Officer Fred may currently not be assigned to an incident, and have no weapon drawn. Officer Fred may be mapped to a level 1 bypass state (do not bypass the virtual partner).

Figure 7:
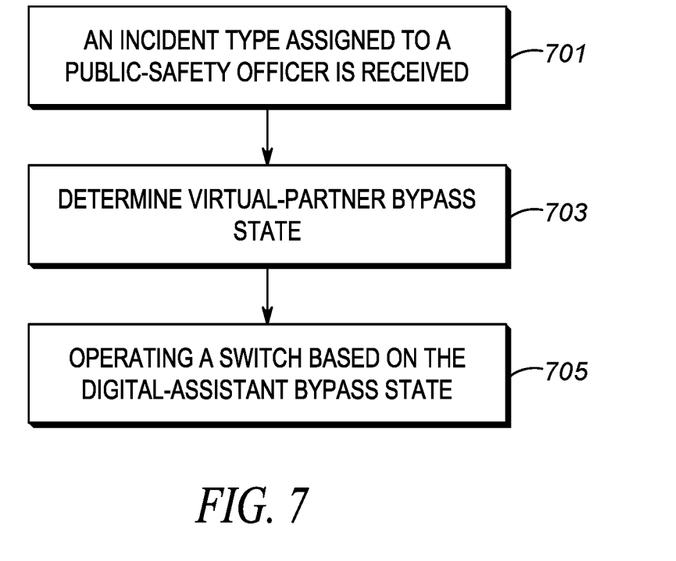
FIG. 7 is a flow chart for determining a digital-assistant bypass state.

FIG. 7 is a flow chart for determining a digital-assistant bypass state. The logic flow begins at step 701 where an incident type assigned to a public-safety officer is received. At step 703 a virtual-partner bypass state is determined based on the incident type. The virtual-partner bypass state may be determined by accessing the database and retrieving a pre-determined bypass state for the particular incident type. As discussed above, these mappings will be stored in database 264. Finally, at step 705 a switch used to bypass a virtual partner is operated based on the virtual-partner bypass state.

As discussed above, the incident type assigned to the public-safety officer may comprise a computer-aided dispatch identification (CAD ID).

Additionally, the virtual-partner bypass state may be based on received sensor data from a plurality of sensors that form a PAN. As discussed, the sensor may comprise information from sensors forming a personal-area network (PAN) associated with the public-safety officer.

Figure 8:
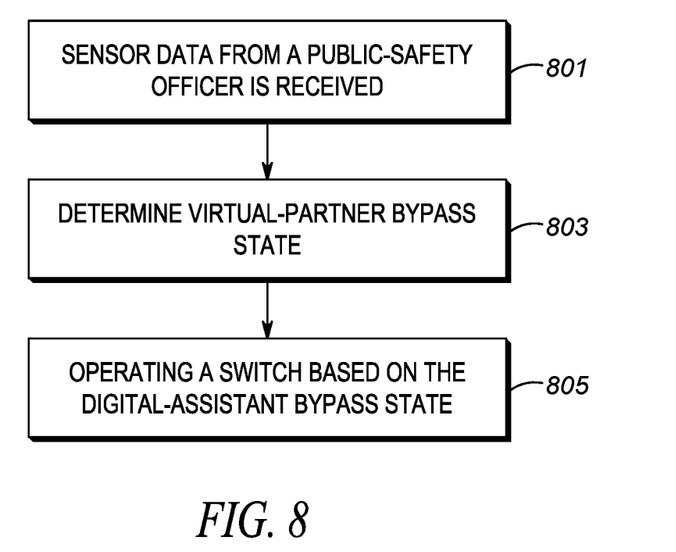
FIG. 8 is a flow chart for determining a digital-assistant bypass state.

FIG. 8 is a flow chart for determining a digital-assistant bypass state. The logic flow begins at step 801 where sensor data is received. At step 803 a virtual-partner bypass state is determined based on the sensor data. The virtual-partner bypass state may be determined by accessing the database and retrieving a pre-determined bypass state for the particular incident type. As discussed above, these mappings will be stored in database 264. Finally, at step 805 a switch used to bypass a virtual partner is operated based on the virtual-partner bypass state.

As discussed above, the sensor data may comprise sensor data for the public-safety from sensors forming a personal-area network (PAN) associated with the public-safety officer.

Both FIG. 7 and FIG. 8 are accomplished via the apparatuses shown in FIG. 4, FIG. 5, and FIG. 6. The apparatuses in these figures comprise virtual partner circuitry, a database configured to store virtual-partner bypass states for various combinations of incident types and and/or sensor data, logic circuitry configured to receive an incident type and/or sensor data for a public-safety officer and access the database to determine a virtual-partner bypass state based on the incident type and/or sensor data for the public-safety officer, and a switch configured to bypass the virtual partner circuitry based on the virtual-partner bypass state.

As discussed, the sensor data for the public-safety officer may comprise information from sensors forming a personal-area network (PAN) associated with the public-safety officer, while the incident type for the public-safety officer may comprise a computer-aided dispatch identification (CAD ID).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
    digital assistant circuitry, wherein the digital assistant circuitry is configured to automatically provide a user with information in response to an explicit verbal request for such information posed by the user via a parsed natural language input, and wherein the digital assistant circuitry comprises a software application running on underlying electronic hardware that is capable of understanding natural language, and completes electronic tasks in response to user voice inputs;
    a database configured to store digital-assistant bypass states for various combinations of incident types and and/or sensor data;
    logic circuitry configured to receive an incident type and/or sensor data and access the database to determine a digital-assistant bypass state based on the incident type and/or sensor data; and
    a switch configured to bypass the digital assistant circuitry based on the digital-assistant bypass state, wherein the switch comprises a first output to the digital-assistant circuitry, and a second output to a speaker, and by bypassing the digital-assistant circuitry the switch routes a query away from the digital-assistant circuitry and to the speaker.

2. The apparatus of claim 1 wherein the sensor data comprises sensor data for a public-safety officer that comprises information from sensors forming a personal-area network (PAN) associated with the public-safety officer.

3. The apparatus of claim 1 wherein the incident type comprises a computer-aided dispatch identification (CAD ID) assigned to a public-safety officer.

4. A method comprising the steps of:
    receiving an incident type assigned to a public-safety officer;
    determining a digital-assistant bypass state for digital-assistant circuitry based on the incident type, wherein the digital assistant circuitry is configured to automatically provide a user with information in response to an explicit verbal request for such information posed by the user via a parsed natural language input, and wherein the digital assistant circuitry comprises a software application running on underlying electronic hardware that is capable of understanding natural language, and completes electronic tasks in response to user voice inputs; and
    operating a switch used to bypass the digital assistant circuitry based on the digital-assistant bypass state, wherein the switch comprises a first output to the digital-assistant circuitry, and a second output to a speaker, and by bypassing the digital-assistant circuitry the switch routes a query away from the digital-assistant circuitry and to the speaker.

5. The method of claim 4 wherein the incident type assigned to the public-safety officer comprises a computer-aided dispatch identification (CAD ID).

6. The method of claim 4 further comprising the step of:
    receiving sensor data from a plurality of sensors that form a PAN; and
    wherein the digital-assistant bypass state is also based on the incident type.

7. The method of claim 6 wherein the sensor data for the public-safety officer comprises information from sensors forming a personal-area network (PAN) associated with the public-safety officer.

8. A method comprising the steps of:
    receiving sensor data from a plurality of sensors that form a PAN;
    mapping the sensor data to a digital-assistant bypass state;
    operating a switch to bypass a digital assistant based on the digital-assistant bypass state;

wherein the switch comprises a first output to the digital-assistant, and a second output to a speaker, and by bypassing the digital-assistant, the switch routes a query away from the digital-assistant and to the speaker;

and wherein the digital assistant is configured to automatically provide a user with information in response to an explicit verbal request for such information posed by the user via a parsed natural language input, and wherein the digital assistant comprises a software application running on underlying electronic hardware that is capable of understanding natural language, and completes electronic tasks in response to user voice inputs.

9. The method of claim 8 wherein the sensor data comprises sensor data for a public-safety officer that comprises information from sensors forming a personal-area network (PAN) associated with the public-safety officer.

\* \* \* \* \*